Sept. 8, 1970     R. PROBER     3,527,617

ELECTROLYTIC CYCLONE SEPARATOR AND CELL

Filed March 20, 1968     2 Sheets-Sheet 1

INVENTOR:
RICHARD PROBER
BY: Louis J. Bovasso
HIS ATTORNEY

Sept. 8, 1970 — R. PROBER — 3,527,617
ELECTROLYTIC CYCLONE SEPARATOR AND CELL
Filed March 20, 1968 — 2 Sheets-Sheet 2

INVENTOR:
RICHARD PROBER
BY: Louis J. Bovasso
HIS ATTORNEY

United States Patent Office

3,527,617
Patented Sept. 8, 1970

3,527,617
ELECTROLYTIC CYCLONE
SEPARATOR AND CELL
Richard Prober, Trenton, N.J., assignor to Shell Oil Company, New York, N.Y., a corporation of Delaware
Continuation-in-part of application Ser. No. 402,777, Oct. 9, 1964. This application Mar. 20, 1968, Ser. No. 714,655
Int. Cl. H01m 27/00
U.S. Cl. 136—86
9 Claims

ABSTRACT OF THE DISCLOSURE

Apparatus and method comprising an electrolytic hydrocyclone cell for carrying out electro-chemical processes to be used in combination with a slurry of electrochemical reactant, electrolyte and electrode particles having a density greater than the electrolyte which particles function as a dispersed electrode. A vertical hollow cylindrical body is provided having a conductive parent electrode surface disposed circumferentially about its inner surface. Closure means is provided at the top of the hollow body having a cylindrical open-ended vortex finder of smaller diameter than said electrode surface centrally positioned therein so that the lower end of said vortex finder extends a substantial distance downwardly into said hollow body thereby forming an annulus between said electrode surface and the lower end of said finder. A counter electrode of larger diameter than the vortex finder is mounted in the annulus between the electrode surface and the lower end of the vortex finder, the counter electrode being electrically insulated from the parent electrode surface of the body. Slurry feed means communicates with the annulus for discharging the slurry vortically within the body and centrifugally forcing the particles within the slurry onto the parent electrode surface adjacent to its upper end. Closure means is disposed at the bottom of the body and has an opening therein for discharging underflow from the body and electrical conduits are connected to the parent electrode surface and the counter electrode for completing a circuit providing for current flow when the electrodes are immersed in electrolyte.

CROSS-REFERENCE TO RELATED APPLICATION

This application is a continuation-in-part of application Ser. No. 402,777, filed Oct. 9, 1964, now abandoned.

BACKGROUND OF THE INVENTION

Field of the invention

This invention broadly relates to a method and apparatus for accomplishing electro-chemical processes using dispersed electrode particles, and more particularly to a new concept known as the electrolytic hydrocyclone separator and cell.

Description of the prior art

Cyclones are well known separatory devices for physically classifying fluids of differing densities and/or solids entrained in fluids. In such devices mixtures of several substances differing in density are discharged vortically, e.g., tangentially or spirally, onto the inner wall of a cylindrical shell. The heavier materials move to the outside of the spiral path as a result of the centrifugal forces and the lighter materials migrate toward the central axis of the cylindrical shell where they can be withdrawn.

The present invention while, in appearance, is somewhat similar to that of a hydrocyclone, involves a new concept in which some of the hydrodynamic characteristics of a cyclone separator are combined with the electrodynamic characteristics of an electrolytic cell. This hydrocyclone cell is equipped with electrode elements so that the cell can either supply current, acting as a fuel cell, or consume current, in electrolytic processes.

One of the great attributes of the electrolytic cyclone separator is the added measure of control it supplies to electrodynamic processes by the hydrodynamics of the cell. Since the efficiencies of electrodynamic processes depend on certain physical relationships in the electrolytic cell, such as electrode surface area, adsorption of the reactant onto and, desorption of products from electrode surfaces and concentration polarization, as well as many other factors, this novel cell provides a new dimension in control of some of these factors.

In many electro-chemical processes it is desirable to have relatively large surface area for the electrodes in contact with the electrolyte. An obvious expedient to increase the surface area of electrodes would be to comminute them into a particulate form whereby the surface area of a given electrode could be manifestly increased. If these electrodes in particulate form were placed in porous containers in insulative material they would act much like a porous electrode when contacted with a conductive filament but would give somewhat poorer results because of the added internal resistance caused by the container. Concentration polarization would be difficult to avoid in such a situation, especially within the mass of the particles, i.e., the interstitial voids between particles. Thus, little could be granted by such a procedure and efficiencies could be sacrificed since the effective net surface area of the electrode would not be appreciably greater than that of a porous electrode. However, if the electrode particles are suspended in electrolyte and can be made to contact a surface which will allow electron transfer and current flow to change the rest potential of the electrode particle, the maximum surface area of each particle can be used in electro-chemical processes giving vastly improved efficiencies relative to that particle. In these situations where the electrode particles are suspended in the electrolyte and are made to contact a conductive surface capable of current flow it is sometimes referred to as a "dispersed electrode."

Another very desirable reason to have the electrode in a particulate form is that problems of adsorption and desorption from the electrode surface can sometimes be more easily controlled since the added electrode surface area may compensate for these problems. However, in some electro-chemical processes the desorption of a product may be extremely acute because of the very nature of the product itself. This is especially true when carrying out electro-chemical processes involving organic compounds, especially those of higher molecular weight, since many of these reactions form resinous materials which have a tendency to accumulate on the surface of the electrode requiring that the cell be shut down and the electrodes cleaned at intervals. These types of electrochemical reactions actually complicate the use of electrodes in particulate form since the product on the individual particle surfaces may tend to limit further electrochemical reaction.

In order for a dispersed electrode to be effective, it is necessary to achieve an electrical contact between the individual electrode particles with a conductive surface area so that current flow through the particle can be established. The efficiency of a dispersed electrode is dependent on such a contact and to be efficient the maximum number of contacts of the particles with the conductive surface is required. This problem of establishing these contacts between the individual particles and the parent electrode is critical and is limiting in use of dispersed electrodes in electro-chemical processes.

SUMMARY OF THE INVENTION

It is an object of this invention to provide an electrolytic hydrocyclone separator and cell in which an electrode in particulate form (a dispersed electrode) can be utilized in a highly efficient manner.

Broadly, this novel cyclone separator and cell has a first cylindrical electrode surface disposed circumferentially about the inner wall of a hydrocyclone which is insulated from a counter electrode disposed close to the longitudinal axis of the first electrode, so that there is an annulus between the two electrodes. The first cylindrical electrode surface will be hereinafter referred to as the "parent electrode" meaning generally the electrode that the electrode particles contact or collide with to accomplish electron transfer and current flow. The cyclone separator has an underflow outlet below the parent electrode and an overflow standpipe (vortex finder) centrally located.

A slurry of electrolyte, electrode particles and electrochemical reactants is flowed vortically, and preferably tangentially, onto the inner surface of the parent electrode so that the electrode particles collide with the surface of the parent electrode as a result of centrifugal forces. In the slurry, the reactants may exist as separate or dispersed phase(s), or be dissolved in the electrolyte or adsorbed on the surface of the electrode particles. The electrolyte provides the internal conducting medium between the respective electrodes, and the electro-chemical reactant adsorbed on the surface of the electrode particles will be able to accomplish electron transfer to or from the parent electrode through the particles since the particles will become electrically connected to the parent electrode at the moment of collision. Of course, there is an external circuit connecting the parent and counter electrodes to provide for current flow, either as a source or as a consumer of electrical energy.

After current flow has occurred through the parent electrode as the result of the electron transfer when the electrode particles collide with the parent electrode, the electrode particles are collected from the bottom of the cyclone as underflow while the electrolyte is removed as a substantially solids-free effluent in the overflow. Any reaction products which have not been desorbed from the electrode particles can be stripped from the particles after they are recovered from the bottom of cell and also any such products can be recovered from the electrolyte recovered as overflow from the cell by known separation techniques. Obviously, once the electrode particles and the electrolyte have been stripped of the reaction product(s), they can be used to make an additional slurry with fresh reactant to be recycled through the cell so that the process will be continuous; also, the reaction products are continuously recovered from the system, without shutting down the cell.

Broadly, the method of this invention involves mixing a slurry of electrolyte, electrode particles and electro-chemical reactants; then vortically injecting this slurry onto the inner wall of a cylindrical parent electrode having a counter electrode centrally located thereto so the electrode particles are carried into the parent electrode by centrifugal forces to effect particle collision with the parent electrode to provide for electron transfer and current flow; subsequently recovering the electrode particles as underflow and the electrolyte as overflow; and stripping the electrolyte and the electrode particles of product prior to their recycle with fresh reactants.

Generally, the apparatus for carrying out this invention may, in one embodiment, consist of a vertical, electrically conductive, cylindrical shell closed at the top with a cap plate. Mounted vertically through the cap plate is a cylindrical vortex finder having one end extending downwardly into the cylindrical shell and concentric therewith so there is an annulus therebetween. An electrode which is referred to as the counter electrode, is insulatively mounted contiguously, and preferably circumferentially around the end of the vortex finder extending into the shell. A feed duct communicates with the inside of this conductive cylindrical shell and is oriented to discharge a stream vortically onto the inner wall of the shell. Closing the bottom of the cylindrical shell is an inverted frustoconical section having a funnel-shaped appearance, and ported at the apex to discharge the underflow from this novel electrolytic hydrocyclone. In the simplest embodiment of the invention, the cylindrical conductive shell serves as the parent electrode and the cyclone's structural shell with an electrical lead connected to it. An electrical lead is also connected with the counter electrode and cooperates with the lead on the parent electrode in a circuit external of the cell to develop current flow therebetween. Obviously, when a current is withdrawn from this cell it is operating as a fuel cell and when current is consumed by this cell electrolysis is being accomplished.

It should be appreciated that other types of cyclone separators, such as those shown in Beins et al., U.S. Pat. No. 3,066,854, could be modified to provide an alternate embodiment wherein the slurry entry is spirally rather than tangential. This could be accomplished by those skilled in the art in view of the teaching herein.

By the novel concept in this electrolytic hydroclone separator and cell, new dimensions in the control of electrodynamic factors in electrochemical processes are made available to both the laboratory technician and commercial processes. Those electrodynamic factors which can be specifically controlled by the instant invention are electrode surface area and adsorption and desorption from the electrode surfaces, as well as concentration polarization. Because of the ability to control these factors, certain electro-chemical reactions in which residues are formed on the electrode surfaces which are difficult to desorb are compatible with the instant invention which were uncompatible with previously known tools and methods. These types of reactions can be carried out in the electrolytic hydrocyclone separator and cell since the electrode particles are continuously removed from the cell and can be stripped externally before they are recycled into the cell without interfering with the continuous operation of the cell. Also, this new method and apparatus allowed close thermal control of the operating temperature within the cell which can be conveniently accomplished with appropriate external heat exchangers.

DESCRIPTION OF THE PREFERRED EMBODIMENTS

Figure 1:
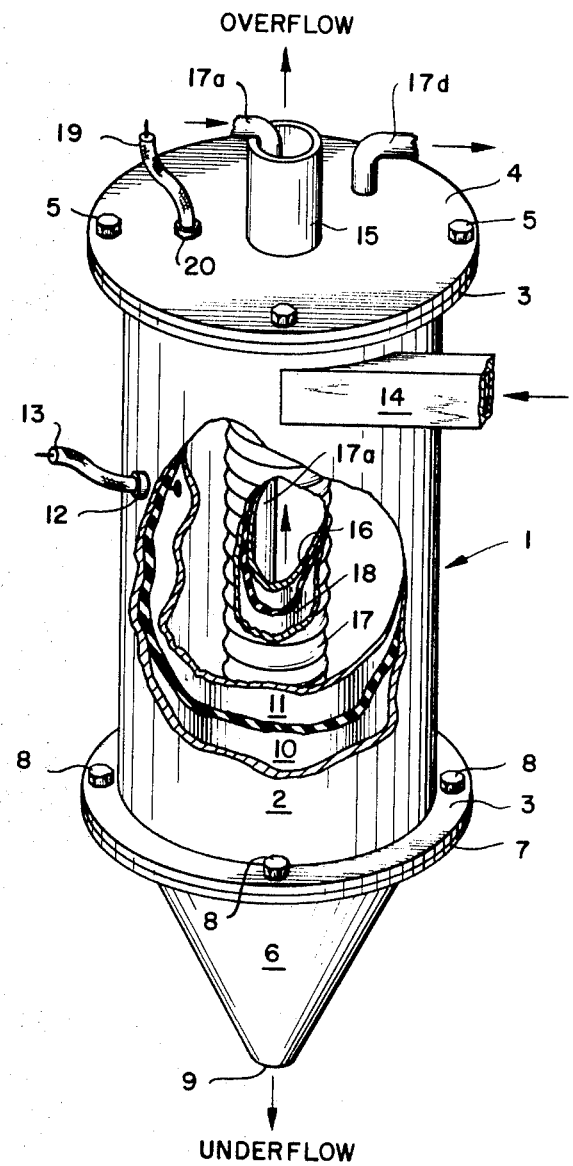
FIG. 1 is a pictorial view of the electrolytic cyclone with parts broken away to show the internal detail.

Referring to FIG. 1, basically, in the preferred embodiment, the body of the cell 1 is composed of a vertical cylindrical shell 2 with ring type connecting flanges 3 located at the top and bottom end. A flat cap plate 4 closes the top of the cylindrical shell 2 and is secured to the top connecting flange 3 by bolts 5. The bottom of the cylindrical shell 2 is closed by a hollow frusto-conical underflow section 6 having a flange 7 that is registered with the bottom connecting flange 3 and secured thereto with bolts 8. The apex 9 of the underflow section 6, which has the appearance of a funnel, has an orifice through which the underflow of the cyclone is discharged from the cell.

The construction of the underflow section 6 which is generally that of a funnel and is similar to that of a normal hydrocyclone separator wherein the heavier particles moving spirally downwardly from the inside of the cylindrical separating zone and discharge directly into the wide mouth of the funnel-shaped section. These particles are recovered through the orifice at the apex 9 of the underflow section 6.

In the preferred embodiment of the invention, shown in FIG. 1, the vertical cylindrical shell 2 is not used directly as the parent electrode as would be the case in a simpler embodiment. Instead, a cylindrical insulating sleeve liner 10 is interposed between the structural shell 2 and a hollow cylindrical parent electrode 11 which has an outside diameter slightly smaller than the inside diameter of shell 2 so that it will fit snugly in the shell with the liner 10 between it and the shell 2. This is the preferred construction since it allows the parent electrode 11 to be replaced so that other parent electrode materials can be used in the cell. This is often important since certain metals are incompatible with certain electro-chemical processes and the metal suitable for a parent electrode 11 in one electro-chemical process may be entirely unsuitable for that in another. In some cases, the parent electrode will be made of platinum which is far superior to most metals but is correspondingly more expensive. Further, the parent electrode may be provided with helical or circumferential lands and grooves circumferentially about its inner surfaces (in the manner shown for the counter electrode 17) to improve the efficiency of the cell. One effect of providing the inner surface of the parent electrode 11 with a grooved surface is to increase the surface area of the parent electrode; and it is also believed that the electrode particle distribution on the parent electrode may be improved by this design.

Parent electrode 11 is connected to the lead of an insulated electrical cable 13 which passes through insulating bushing 12 in the well of the cylindrical shell 2 of the cell 1.

Located adjacently to the top connecting flange 3 in the side of the vertical cylindrical shell 2 is a feed duct 14 which communicates with the inside of the cell 1. The feed duct is adapted and oriented to discharge a stream tangentially onto the inner surface of parent electrode 11. In general, the nozzle (not shown) of the feed duct 14 has a flattened, elongated shape and can be made from conductive or on-conductive material. If the nozzle is made of conductive material, it should be effectively insulated from the parent electrode 11 so that currents are not carried from the cell through its feed duct 14.

Centrally mounted in and normal to cap plate 4 is a hollow cylindrical open-ended vortex finder 15 of smaller diameter than electrode 11. One end of the vortex finder projects vertically above the cap plate 4 and the lower end 16 projects downwardly a substantial distance into the vertical cylindrical shell 2 and is concentric therewith thereby forming an annulus between electrode 11 and the lower end 16 of finder 15.

Mounted circumferentially about the lower end 16 of the vortex finder 15 is a cylindrical counter electrode 17 of larger diameter than finder 15 which is insulated from this lower end 16 by an insulating material 18 disposed in the annulus formed between the counter electrode 17 and the lower end 16 of the vortex finder 15. An electrical cable 19 is connected to the electrode 17 and extends through an insulating bushing 20 in cap plate 4. Cell 1 also includes a gas inlet 17a and a gas outlet 17d for reasons to be discussed further hereinbelow.

Figure 2A:
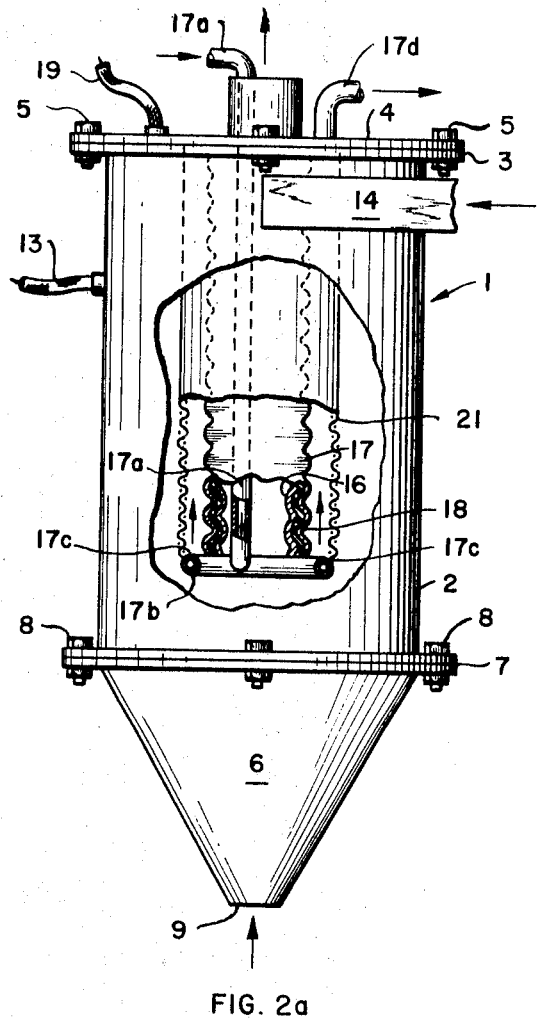
FIG. 2a is a detail of a portion of the cell of FIG. 1.
Figure 2:
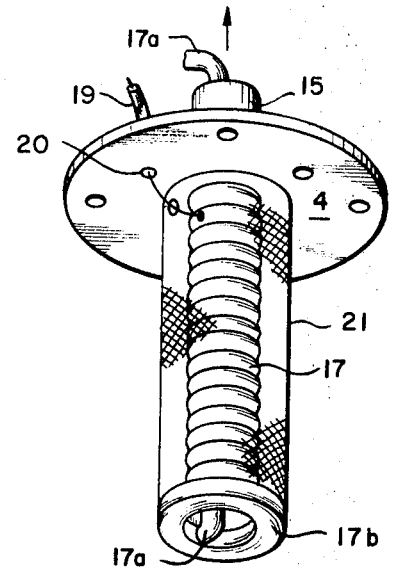
FIG. 2 is a pictorial view of the underside of the cap plate showing the vortex finder and the counter electrode encompassed by a cylindrical protective barrier shroud, which is an alternate embodiment of the invention.

Referring to FIG. 2, showing an alternate embodiment of the invention, the entry of external electrical lead 19 through insulating bushing 20 and its connection to the counter electrode 17 can be seen; these are the same as for the first embodiment. In addition, FIG. 2 shows the incorporation of a permeable cylindrical barrier shroud 21 which encompasses the counter electrode 17 to protect it from direct contact by dispersed electrode particles suspended in the electrolyte when the cell is in operation. The barrier shroud 21 can be a diaphragm, especially in electrochemical reactions where separate catholytes and anolytes are used, to prevent mixing of the anolyte and catholyte as a result of the hydrodynamic flow patterns. Shroud 21, for example, could be used where a gas, such as air or oxygen, is bubbled, as will be discussed hereinbelow with reference to FIG. 2a, onto the surface of the counter electrode 17 when the cell is used as a fuel cell to prevent dispersion of the oxygen. This barrier shroud 21 can be a screen type material of small mesh or a permeable membrane type material. While the protective shroud may be necessary in some types of operation, as indicated, it is not desirable to use it in the cell as a matter of routine, if the chemistry does not require it, since it measurably increases the internal resistance of the cell. Since, in both embodiments, the particles are introduced in a slurry vortically within the cell and the particles, having a greater density than the electrolyte within the slurry, are forced centrifugally outwardly onto the parent electrode surface 11, no short takes place. If it were found that an internal short was created because a slurry of catalytic metal particles was introduced between the parent and counter electrodes, the addition of the barrier shroud 21 would overcome these difficulties. The shroud 21 would ensure that none of the particles reached the counter electrode 17 and made contact therewith. Of course, a permeable barrier would be necessary when the cell is used as a fuel cell as will be discussed further hereinbelow.

Referring now to FIG. 2a, inlet 17a is connected, at one end, to an external oxygen source (not shown) and passes through electrode 17 to a ring portion 17b surrounding the lower end of electrode 17. Openings 17c in ring portion 17b of gas inlet 17a open upwardly with relation to electrode 17. The ring portion 17b is disposed between electrode 17 and barrier shroud 21 so that an appropriate gas, such as air or oxygen, may be brought from an outside source and bubbled upwardly over the outer surfaces of counter electrode 17. Cell 1 also includes a gas outlet 17d for removing gas from the interior of cell 1.

Figure 3:
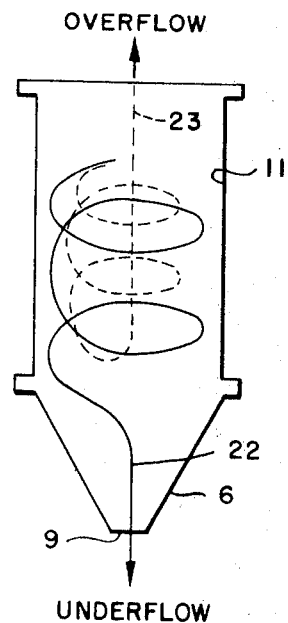
FIG. 3 is a diagrammatic elevational view of electrolytic hydrocyclone cell with arrows showing the primary flow patterns of the electrode particles and of the electrolyte.

FIG. 3 diagrammatically shows the general flow pattern in the cyclone cell with the solid lines 22 representing the means path of the electrode particles and broken line 23 representing the mean flow of the electrolyte which leaves the cell as overflow through the vortex finder.

Figure 4:
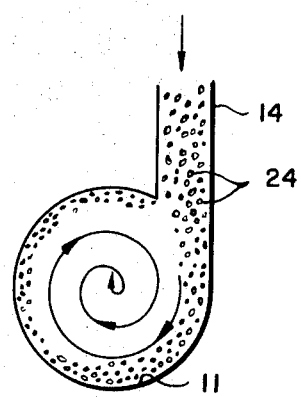
FIG. 4 is a diagrammatic cross section of the electrolytic hydrocyclone cell showing the distribution of the electrode particles effected by the centrifugal forces in the cell.

In FIG. 4 the collision of the electrode particles 24 against the parent electrode 11 is diagrammatically illustrated showing the effect of the centrifugal forces of the electrode particles as they are injected into the cyclone cell through the feed duct 14.

In both FIGS. 1 and 2, it can be seen that the counter electrode 17 has an irregular exterior surface. This is done to increase the effective surface area of the counter electrode 17 since it would otherwise have a much smaller surface area than parent electrode 11. Apparently, it would always be advisable to construct the counter electrode 17 in a manner to provide a surface area approximating that of the parent electrode 11.

In the practice of the invention, a slurry of electrode particles, electrolytes and electro-chemical reactants is prepared externally to the cell and then pumped in the feed duct 14 from which it is discharged tangentially and centrifugally forced onto the inner surface of parent electrode 11 adjacent its upper end. The reactant, in many cases, will be absorbed on the electrode particles and as the particles collide with the parent electrode 11, electron transfer will be accomplished. This causes electro-chemical reaction to take place on the surfaces of the individual particles at that time. Since the cell receives a constant stream of electrolyte, electrode particles and reactant, the electrolyte will provide an internal liquid electrical connection between the electrode particles contacting the parent electrode and the counter electrode when the cell is operated substantially full of the slurry.

The electrode particles will eventually spiral down the cylindrical wall of the counter electrode 11 and be discharged into the frusto-conical underflow section 6 from which they are discharged with a very small amount of electrolyte from the orifice at the apex 9 of this funnel-shaped section. Similarly, the electrolyte is recovered through the vortex finder as overflow. Since both the electrolyte and the electrode particles are withdrawn from the hydrocyclone cell in separate effluents, either or both may be stripped of reaction products and/or by-products, as the case may be, in separate operations external of the cell without interfering with its operation. After such materials have been stripped from the electrode particles and/or electrolyte, both can be re-slurried with fresh reactant and be recycled into the cell through duct 14.

It will be obvious to those skilled in the art that separate treatments of both the electrolyte and electrode particles which are physically separated by the cell may be employed external of the cell and when sufficient quantities of electrolyte and electrode particles are employed the process can be continuous.

Generally, the electrode particles 24 are solid conductive particles or particles having conductive coatings on their surfaces. Materials useful as conductive particles or coatings are generally metals and carbon. Specific examples are silicon, germanium, cesium, nickel, silver, copper, iron, platinum and the like. In fact, most materials suitable for electrodes and electro-chemical reactions can be comminuted to form the electrode particles used in this invention.

While the size of the individual electrode particles is not controlling, the net density of the particles apparently is controlling. The density of the particles must exceed that of the liquid component of the slurry. The reason the density tends to affect the operation is the requirement that the particles be moved through the electrolyte by centrifugal force, and that the maximum number of collisions between the electrode particles and the surface of the parent electrode 11 be obtained. These collisions of the particles on the surface of the parent electrode are extremely important to the operation of the electrolytic hydrocyclone since it is by this collision that the maximum number of particles are able to achieve at least a temporary electrical connection with the parent electrode 11. Thus, if the electrode particles are very small, say in the sub-micron range, as they are in colloidal particles, the diameter of the cyclone cell must be small to insure these small particles will be carried out against the surface of the parent electrode. On the other hand, the larger particles will provide the desired impact forces on collision with the parent electrode, but are difficult to keep in suspension in the slurry so that a homogeneous slurry can be introduced into the cyclone separator and cell. Because of these problems, the electrode particles of comminuted metals should preferably have an average particle size from 5 to 500 microns. Of course, the cell will operate with any amount of particles dispersed in the slurry with varying degrees of efficiency, the only requirement being, as discusssed hereinabove, that the density of the particles be greater than that of the electrolyte.

A convenient way to avoid the problem experienced with larger sized particles is to plate conductive surfaces on less dense cores so that a desired net density can be achieved. While such conductively coated particles are expensive, there is no reason why the designed parameters of an electrolytic hydrocyclone could not encompass the use of electrode particles having sizes approximating that of golf balls. Also, it may be desirable to plate catalytic materials on lighter weight cores in some electro-chemical reactions.

The following examples are illustrative of the invention but are not intended to limit it.

EXAMPLE I

Fuel cell

A slurry of platinum black particles having an average diameter of 100 microns was slurried with 13-normal phosphoric acids saturated with methane reactant to form a slurry. This slurry was pumped into a plastic hydrocyclone separator and cell similar to that of FIG. 1 having a platinum parent electrode (anode) and a platinum counter electrode (cathode). The counter electrode was housed in a shroud similar to shroud 21 of FIG. 2 and air was bubbled onto the surface of the counter electrode in the manner discussed hereinabove with reference to FIG. 2a. Both electrodes were connected to an external power consumption sink.

During the period this slurry was circulated in the cell, a current was consumed in the sink.

EXAMPLE II

Electrolysis

In this experiment a plastic hydrocyclone separator and cell similar to that of FIG. 1 having a 2-inch internal diameter was equipped with a nickel parent electrode having an internal diameter of 1⅞ inches. A platinum sleeve around the vortex finder served as the counter electrode.

A solution of 0.1 molar NaOH saturated with air served as the electrolyte. This electrolyte was slurried with about 10% by weight of silver particles which would pass a 200-mesh sieve and this slurry was pumped into the inlet duct of the cyclone separator and cell at a flow rate between 10 and 15 liters per minute. The outer parent electrode served as a cathode and all current flow was measured with the potential on the parent electrode of $-1.0$ volt with reference to an Ag/AgCl electrode. When the cyclone cell was in operation, the current flow was 350 milliamperes. For comparison the same experiment was conducted without the silver particles and the current flow was 35 milliamperes, showing a ten-fold improvement in the rate of formation of OH ion by the use of the invention.

It is believed that the above two examples aptly illustrate the invention and that persons skilled in the electrochemical arts could apply numerous electro-chemical processes to the basic concept of the electrolytic hydrocyclone separator and cell.

Further, it should be obvious that the parent electrode can be of a higher or lower potential than the counter electrode and that the potential on each would depend largely upon the particular electro-chemical process being carried out in the cell.

Various modifications may be made within the spirit of the invention and scope of the appended claims.

I claim as my invention:

1. An electrolytic hydrocyclone cell to be used in combination with a slurry of electrochemical reactant, electrolyte and electrode particles, which particles have a density greater than the electrolyte thereby functioning as a dispersed electrode comprising:

a vertical hollow cylindrical body having a conductive parent electrode surface disposed circumferentially about its inner surface;

closure means at the top of said hollow body having a cylindrical open-ended vortex finder of smaller diameter than said electrode surface centrally positioned therein so that the lower end of said vortex finder extends a substantial distance downwardly into said hollow body thereby forming an annulus between said electrode surface and the lower end of said finder, said vortex finder having a hollow ring disposed at its lowermost end, said ring containing openings therein;

a counter electrode of larger diameter than said vortex finder mounted in said annulus between said electrode surface and said lower end of said vortex finder which is electrically insulated from said parent electrode surface of said body, said counter electrode being encased in permeable barrier shroud means adapted to protect the counter electrode from direct contact by dispersed electrode particles suspended in the electrolyte contained in said body, the openings in said ring opening within the annulus formed between said counter electrode and said permeable barrier shroud means;

gas inlet means disposed in said body and communicating with said ring for introducing gas therein;

said closure means having an outlet therein communicating with the annulus formed between said electrode surface and said shroud means;

slurry feed means communicating with said annulus between said electrode surface and said lower end of said vortex finder for discharging said slurry passing through said feed means vortically within said body and centrifugally forcing said particles in said slurry onto said parent electrode surface of said hollow body adjacent the upper end thereof;

bottom closure means disposed at the bottom of said hollow cylindrical body having an opening therein communicating with said annulus formed between said electrode surface and the lower end of said vortex finder for discharging underflow from said body; and electrical conduits connected to said parent electrode surface and said counter electrode for completing a circuit providing for current flow when said electrodes are immersed in electrolyte.

2. The apparatus described in claim 1 in which the parent electrode surface is a cylindrical hollow sleeve of conductive material removably mounted in close fitting relationship within said hollow cylindrical body.

3. The apparatus as described in claim 2 in which the parent electrode sleeve is grooved on its inner surface to provide additional surface area.

4. The apparatus as described in claim 1 in which the counter electrode mounted in the annulus between the parent electrode and the end of the vortex finder is a cylindrical sleeve of electrically conductive material which is mounted circumferentially around said lower end of said vortex finder.

5. The apparatus as described in claim 1 in which the feed means discharges said slurry passing therethrough tangentially onto the electrically conductive parent electrode surface of the hollow cylindrical body.

6. A method of producing electricity in which current flows using a dispersed electrode in which the electrode particles are suspended in an electrolyte of a lower density than the particles in the presence of electro-chemical reactant using a modified hydrocyclone which includes a vertical hollow cylindrical body having a conductive parent electrode surface disposed circumferentially about its inner surface, closure means at the top of said hollow body having a cylindrical open-ended vortex finder of smaller diameter than said electrode surface centrally positioned therein so that the lower end of said vortex finder extends a substantial distance downwardly into said hollow body thereby forming an annulus between said electrode surface and the lower end of said finder, said vortex finder having a hollow ring disposed at its lowermost end, said ring containing openings therein, a counter electrode of larger diameter than said vortex finder mounted in said annulus between said electrode surface and said lower end of said vortex finder which is electrically insulated from said parent electrode surface of said body, said counter electrode being encased in permeable barrier shroud means adapted to protect the counter electrode from direct contact by dispersed electrode particles suspended in the electrolyte contained in said body, the openings in said ring opening within the annulus formed between said counter electrode and said permeable barrier shroud means, gas inlet means disposed in said body and communicating with said ring for introducing gas therein, said closure means having an outlet therein communicating with the annulus formed between said electrode surface and said shroud, means, slurry, feed means communicating with said annulus between said electrode surface and said lower end of said vortex finder for discharging said slurry passing through said means vortically within said body and centrifugally forcing said particles in said slurry onto said parent electrode surface of said hollow body adjacent the upper end thereof, bottom closure means disposed at the bottom of said hollow cylindrical body having an opening therein communicating with said annulus formed between said electrode surface and the lower end of said vortex finder for discharging underflow from said body, and electrical conduits connected to said parent electrode surface and said counter electrode for completing a circuit providing for current flow when said electrodes are immersed in electrolyte, said method comprising the steps of:

mixing a slurry of said electrode particles, electrolyte and electro-chemical reactant;

vortically introducing said slurry into said modified hydrocyclone whereby said electrode particles contained within said slurry are carried onto the inner surface of said parent electrode surface by centrifugal forces adjacent the upper portion thereof;

simultaneously withdrawing said electrolyte as overflow through said vortex finder and said electrode particles as underflow in a manner which ensures that said parent and counter electrodes are immersed in said electrolyte; and recovering the electro-chemical products produced by current flow between said electrode particles, parent electrode and counter electrode from the effluent of said modified hydrocyclone.

7. A method according to claim 6 including the step of recycling the electrode particles and the electrolyte with fresh electro-chemical reactant after the electrochemical products have been recovered therefrom.

8. The method according to claim 7 including the step of bubbling gas upwardly over the outer surface of said counter electrode.

9. The method according to claim 6 in which the step of vortically introducing said slurry includes introducing said slurry tangentially onto the inner surface of the conductive parent electrode surface.

References Cited

UNITED STATES PATENTS 2,809,928   10/1957   Dudley et al. _____ 204—1.1

JOHN H. MACK, Primary Examiner

H. A. FEELEY, Assistant Examiner

U.S. Cl. X.R.
204—260, 272, 277